(12) United States Patent
Bjernetun

(10) Patent No.: US 12,181,307 B2
(45) Date of Patent: *Dec. 31, 2024

(54) CONTROL ARRANGEMENT FOR A VEHICLE

(71) Applicant: VOLVO TRUCK CORPORATION, Gothenburg (SE)

(72) Inventor: Johan Bjernetun, Mölnlycke (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/427,180

(22) Filed: Jan. 30, 2024

(65) Prior Publication Data

US 2024/0167843 A1 May 23, 2024

Related U.S. Application Data

(63) Continuation of application No. 16/625,594, filed as application No. PCT/EP2017/065676 on Jun. 26, 2017, now Pat. No. 11,933,630.

(51) Int. Cl.
*G01C 21/00* (2006.01)
*G01C 21/36* (2006.01)
*G06V 20/56* (2022.01)

(52) U.S. Cl.
CPC ..... *G01C 21/3841* (2020.08); *G01C 21/3602* (2013.01); *G01C 21/3658* (2013.01); *G01C 21/3691* (2013.01); *G01C 21/3822* (2020.08); *G06V 20/56* (2022.01)

(58) Field of Classification Search
CPC .. G05D 1/0038; G05D 1/0212; G05D 1/0231; G05D 1/0276; B60W 50/00; B60W 2050/0075; B60W 2556/45; B60W 60/007; H04W 4/44
See application file for complete search history.

(56) References Cited

U.S. PATENT DOCUMENTS

| 2002/0161519 | A1 | 10/2002 | Mori et al. |
| 2010/0228470 | A1 | 9/2010 | Sakakibara |
| 2012/0023057 | A1 | 1/2012 | Winberry et al. |
| 2014/0032087 | A1 | 1/2014 | Shiri et al. |
| 2014/0200038 | A1 | 7/2014 | Rao et al. |

(Continued)

FOREIGN PATENT DOCUMENTS

| CN | 102016507 A | 4/2011 |
| CN | 102667409 A | 9/2012 |

(Continued)

OTHER PUBLICATIONS

International Search Report and Written Opinion dated Mar. 2, 2018 in corresponding International PCT Application No. PCT/EP2017/065676, 11 pages.

(Continued)

*Primary Examiner* — Yuen Wong
(74) *Attorney, Agent, or Firm* — Venable LLP; Jeffri A. Kaminski

(57) ABSTRACT

The present disclosure relates to a control arrangement (200) for a vehicle (100, 102), specifically adapted for use and creation of map data for improved operation of the vehicle (100, 102). The present disclosure also relates to a corresponding method and computer program product.

18 Claims, 4 Drawing Sheets

(56) References Cited

U.S. PATENT DOCUMENTS

| | | |
|---|---|---|
| 2014/0278095 A1 | 9/2014 | Kaehler et al. |
| 2015/0298691 A1 | 10/2015 | Kodaira et al. |
| 2016/0203422 A1 | 7/2016 | Demarchi et al. |
| 2016/0259814 A1 | 9/2016 | Mizoguchi |
| 2017/0139414 A1 | 5/2017 | Muto |
| 2017/0349177 A1 | 12/2017 | Andersson et al. |
| 2018/0066954 A1* | 3/2018 | Oder ................ B60W 60/0027 |
| 2018/0089899 A1 | 3/2018 | Piemonte et al. |
| 2018/0162410 A1 | 6/2018 | Skillsäter et al. |
| 2018/0292543 A1 | 10/2018 | McFarland et al. |
| 2020/0104606 A1 | 4/2020 | Negre et al. |

FOREIGN PATENT DOCUMENTS

| | | |
|---|---|---|
| CN | 102735248 A | 10/2012 |
| CN | 102906541 A | 1/2013 |
| CN | 103238044 A | 8/2013 |
| CN | 105937912 A | 9/2016 |
| EP | 1930694 A2 | 6/2008 |
| JP | 2016180980 A | 10/2016 |
| WO | 2012072094 | 6/2012 |

OTHER PUBLICATIONS

Chinese Office Action dated Feb. 3, 2023 in corresponding Chinese Patent Application No. 201780092316.X, 27 pages.
Chinese Office Action dated Sep. 6, 2023 in corresponding Chinese Patent Application No. 201780092316.X, 28 pages.

* cited by examiner ical Field

CONTROL ARRANGEMENT FOR A VEHICLE

CROSS-REFERENCE TO RELATED APPLICATIONS

This patent application is a continuation of U.S. patent application Ser. No. 16/625,594, filed Dec. 20, 2019, which is a U.S. National Stage application of PCT/EP2017/065676, filed Jun. 26, 2017 and published on Jan. 2, 2019 as WO/2019/001678 A1, all of which is hereby incorporated by reference in its entirety.

TECHNICAL FIELD

The present disclosure relates to a control arrangement for a vehicle, specifically adapted for use and creation of map data for improved operation of the vehicle. The present disclosure also relates to a corresponding method and computer program product.

BACKGROUND

Recently there have been great advances in use of pre-registered map data for use in operating a vehicle, allowing semi or fully autonomous operation of at least some functions of the vehicle. Such functions may generally include automatic cruise control where the vehicle is operated to dynamically advance at a speed limit set for a road segment. Other functions may also include semi or fully automatic transmission control based on a preregistered inclination/curvature for the specific road segment. Both of the exemplified functions allows for an improved operation of the vehicle, focusing on safety and improved fuel economy.

Generally, for achieving e.g. safe and fuel efficient operation of the vehicle there is a need to provide the vehicle with adequate map data. Such map data may be stored locally at a data source provided with the vehicle or at a remote data source, where the remote data source is accessed using e.g. a network connection. The use of the remote data source may be advantageous since such a solution allows for continuous update of the map data, rather than having to rely on potentially "old" map data, as would be the case of using a rarely updated local data source.

To be on the safe side, it may be possible to use more than a single data source. An example of such a solution is disclosed in US20020161519. Specifically, US20020161519 presents the concept of selectively using map data from one of a locally and a remotely located data source. In accordance to the presented solution, a control functionality provided at the vehicle will determine the reliability of the locally vs. the remotely located map data and use the map data that is determined to be "most" reliable.

However, even if the solution presented in US20020161519 will provide some advantageous over only using a locally arranged data source, there may still be situations where both data sources (i.e. both the locally and the remotely located data source) lacks reliable map data. Accordingly, it would be desirable to provide further enhancements within this technical area with the purpose of ensuring improved robustness of the vehicle operation.

SUMMARY

According to an aspect of the present disclosure, the above is at least partly alleviated by a control arrangement for a first vehicle the control arrangement being provided on-board the first vehicle and comprising a control unit, wherein the control unit is adapted to receive information relating to a current geographical location of the first vehicle, and send a request for a portion of map data from a first data source relating to the current location of the first vehicle, wherein the first data source is arranged remote from the first vehicle and comprises map data for a plurality of geographical locations and each portion of the map data relates to environmental information for the related geographical location, wherein the control unit is further adapted to apply the map data for controlling at least one parameter for operating the first vehicle if map data is indicated as available from the first data source for the current geographical location. Otherwise, if map data is indicated as unavailable from the first data source for the current geographical location the control unit will receive environmental information relating to the operation of the first vehicle, attach a geographical tag relating to the current geographical location to the environmental information for the current location, establish a network connection with a second data source, wherein the second data source 206 is arranged remote from the first vehicle adapted for storage of environmental information, and different from the first data source, and provide the geographically tagged environmental information for storage at the second data source.

In accordance to the present disclosure, map data relating to a current geographical location (e.g. a road segment possibly having a road ID) for the first/own vehicle is acquired from a first remote data source, for example using a network connection such as the Internet. In case the request is met, i.e. map data is received from the first data source, the received map data is used by control means comprised with the vehicle for operating the vehicle. The map data accordingly comprises information useful in controlling functions of the vehicle during operation of the vehicle. The control arrangement may thus be seen as operating in a "use mode". As indicated above, such operation based on the information comprised with the map data received from the first data source may for example allow for semi or fully automatic operation of a drive train of the vehicle, including e.g. speed and transmission control of the vehicle for optimizing safety, environmental behavior and fuel economy when driving the vehicle.

The information comprised with the map data may accordingly e.g. comprise information relating to a speed limit for the current geographical location and information relating to an inclination or curvature of a road segment at the current geographical location. Further information may similarly be included, where the information is to be used for allowing semi or fully automatic operation of the vehicle. In a possible embodiment of the present disclosure, the information comprised with the map data may include indications of temporary adjustments for operating the vehicle at the road segment at the current geographical location, possibly due to an accident or a changing weather condition.

However, if no map data is received from the first data source (e.g. due to a communication error or if information about missing map data otherwise has been received) or the first data source communications information being indicative of that no data is available at the first data source, then the control arrangement according to the present disclosure seamlessly transition into a "collection mode", where environmental data relating to the operation of the first/own vehicle is collected and provide with suitable meta data for example relating to the current location (e.g. again possibly being a road segment having a road ID) for the vehicle and/or a type of the vehicle. It should further be understood that in some cases the transition to the collection mode may take place due to the fact that some, but not all, of the information comprised with the map data provided by the first data source is missing. Such a scenario may for example appear in case e.g. information relating to a speed limit for a specific road segment is missing while information relating to inclination of the road segment is available.

The environmental data collected by the control arrangement may for example comprise data relating to a present (and possibly predicted) inclination/curvature of the road segment being currently travelled by the vehicle. Thus, map data for a road segment at a specific geographical location (i.e. the current location for the vehicle) is formed by the control arrangement. Following the collection and "tagging" of the environmental data, a network connection, e.g. using a transceiver comprised with the control arrangement, is established with a second remotely arranged data source, the second data source being different from the first data source. Once the network connection has been formed between the control arrangement and the second data source the tagged environmental data is uploaded to the second data source.

An advantage following the seamless transition between the use mode and the collection mode is that environmental data quickly may be collected for e.g. road segments where no map data for use on operating the vehicle has been previously collected. Thus, rather than just awaiting that e.g. a commercial map supplier (typically operating/providing the first data source) is to update the first data source, the control arrangement provided in accordance to the present disclosure takes "matter in to its own hands" and collects such environmental data that may be useful for the own vehicle or another vehicle (e.g. a second vehicle being different from the first vehicle) once that specific road segment is to be travelled again by the own vehicle or another vehicle.

In accordance to the present disclosure, it may be possible to transition back to the use mode, i.e. to again use the first data source if map data is indicated as available from the first data source for the current geographical location. However, rather than directly start to apply the map data from the first data source; it may be desirable to apply a "smooth transition" approach for avoiding that the vehicle behaves in a "jerky" manner. Accordingly, it may be possible to allow the map data to "increasingly influence" the operation of the vehicle over a predetermined period.

It is advantageously if at least one of the first and the second data sources are arranged in communication with a remote server, such as a cloud server, specifically adapted for allow access to any vehicle in need of map data for improved vehicle operation. Such an implementation allows swift and easy access to the data sources.

The control unit may in one embodiment be an electronic control unit (ECU), typically provided as an onboard component of the vehicle, the vehicle for example being a truck, a bus, a car. The vehicle may furthermore be at least one of a pure electrical vehicle (PEV) and a hybrid electric vehicle (HEV).

Furthermore, it should be understood that the information of the current geographical location of the vehicle for example may be received from a geolocation arrangement, such as for example a GLONASS or GPS receiver comprised with the vehicle or the control arrangement working machine. Information relating to the current geographical location of the first vehicle may also comprise information relating to a relative orientation of the first vehicle for determining a direction of travel at the road segment. The geolocation arrangement may also be complemented by a navigation system comprised with the vehicle, e.g. for planning of an upcoming route to be travelled by the vehicle.

The environmental data collected by the control arrangement is received from at least one but typically a plurality of sensors arranged internally and externally of the own/first vehicle. Such sensors may for example relate to sensors adapted to determine a current inclination of the road segment. Alternatively, it may also be possible to receive data from e.g. a CAN bus comprised with the vehicle for acquiring vehicle data, e.g. for determining how the own/first vehicle is currently operated, such as relating to a current transmission setting, speed, RPM, fuel consumption, etc. Such environmental data, once received at the second data source, may be processed for forming map data that may be used for optimized operation once a vehicle (e.g. the first/own or another vehicle) is again travelling at that specific road segment. Other sensors, e.g. including cameras, are of course possible and within the scope of the present disclosure.

In a possible embodiment of the present disclosure, it may be possible to allow the collection mode to "run" in parallel with the use mode. That is, rather than solely collecting environmental data once no map data is received from the first data source, it may be possible to, e.g. continuously, collect environmental data and to compare this data with the map data received from the first data source. In case the comparison indicates that there is a difference being greater than a predetermined threshold (e.g. 10%-20%), then this may also be seen as an indication that the map data stored at the first data source is not corresponding to the "actual" road condition at the current location. Thus, again the control arrangement may focus on collection and tagging environmental data that is to be stored at the second data source.

Within the concept of the present disclosure, the second data source may typically be seen as an alternative to the first data source comprising "own vehicle recorded data", not being provided from a commercial map data supplier and thus not necessarily being of as high quality as would be expected when receiving map data from a commercial map data supplier. For example, a vehicle brand or a collection of vehicles (e.g. a vehicle fleet) may collectively work together with populating the second data source with environmental data that then may be used by the connected vehicles in case no map data is being available at the first data source.

Accordingly, in a typical embodiment the first/own vehicle may also make use of environmental data collected by other vehicles for operating the own/first vehicle. Thus, once environmental data has been collected by a vehicle and "converted" to map data for vehicle operation that converted map data may be part of the map data used during the operation of the vehicle. Such converted map data may as such be stored in an "alternative" first data source that is arranged in network communication with the vehicle. In a preferred embodiment, it may be possible for the first/own vehicle to prioritize using the "original" first data source, and then use the "alternative first data source" in case the original first data source had no map data available.

According to another aspect of the present disclosure there is provided a method for controlling an operational parameter for a first vehicle, the first vehicle provided with an on-board control arrangement comprising a control unit, wherein the method comprises the steps of receiving information relating to a current geographical location of the first vehicle, and sending a request for a portion of map data from a first data source relating to the current location of the first vehicle, wherein the first data source is arranged remote from the first vehicle and comprises map data for a plurality of geographical locations and each portion of the map data relates to environmental information for the related geographical location, and determining if map data is indicated as available from the first data source for the current geographical location, applying the map data for controlling at least one parameter for operating the first vehicle if map data is indicated as available. Otherwise, if map data is indicated as unavailable the method will be adapted for receiving environmental information relating to the operation of the first vehicle, attaching a geographical tag relating to the current geographical location to the environmental information for the current location, establishing a network connection with a second data source, wherein the second data source is arranged remote from the first vehicle, adapted for storage of environmental information, and different from the first data source, and providing the geographically tagged environmental information for storage at the second data source. This aspect of the present disclosure provides similar advantages as discussed above in relation to the previous aspect of the present disclosure.

According to a further aspect of the present disclosure there is provided a computer program product comprising a non-transitory computer readable medium having stored thereon computer program means for controlling an operational parameter for a first vehicle, the first vehicle provided with an on-board control arrangement comprising a control unit, wherein the computer program product comprises code for receiving information relating to a current geographical location of the first vehicle, and code for sending a request for a portion of map data from a first data source relating to the current location of the first vehicle, wherein the first data source is arranged remote from the first vehicle and comprises map data for a plurality of geographical locations and each portion of the map data relates to environmental information for the related geographical location, and code for determining if map data is indicated as available from the first data source for the current geographical location, code for applying the map data for controlling at least one parameter for operating the first vehicle if map data is indicated as available. Otherwise, if map data is indicated as unavailable, there is provided code for receiving environmental information relating to the operation of the first vehicle, code for attaching a geographical tag relating to the current geographical location to the environmental information for the current location, code for establishing a network connection with a second data source, wherein the second data source is arranged remote from the first vehicle, adapted for storage of environmental information, and different from the first data source, and code for providing the geographically tagged environmental information for storage at the second data source. Also this aspect of the present disclosure provides similar advantages as discussed above in relation to the previous aspects of the present disclosure.

The computer readable medium may be any type of memory device, including one of a removable nonvolatile random access memory, a hard disk drive, a floppy disk, a CD-ROM, a DVD-ROM, a USB memory, an SD memory card, or a similar computer readable medium known in the art.

Further advantages and advantageous features of the present disclosure are disclosed in the following description and in the dependent claims.

BRIEF DESCRIPTION OF THE DRAWINGS

With reference to the appended drawings, below follows a more detailed description of embodiments of the present disclosure cited as examples.

In the drawings.

DETAILED DESCRIPTION

Figure 1A:
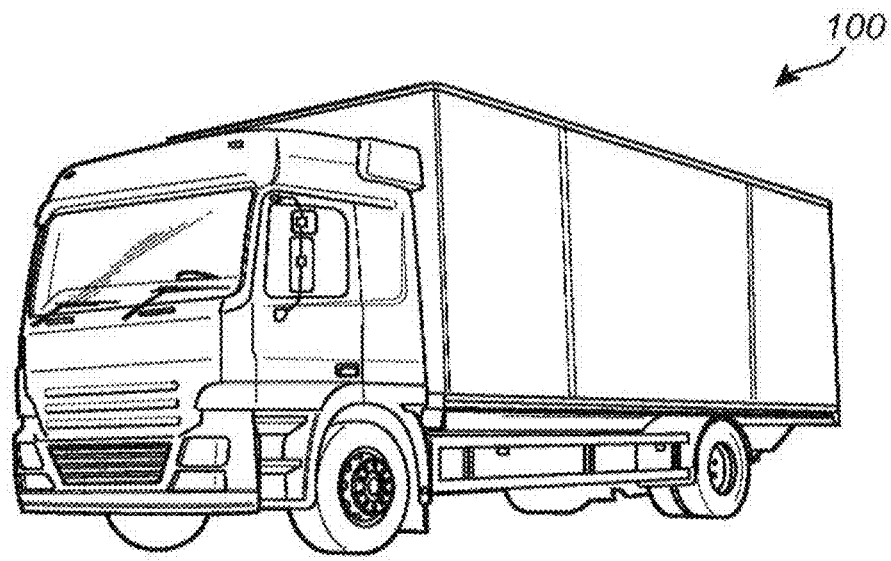
FIG. 1A illustrates a truck and 1B a bus in which a control arrangement according to the present disclosure may be incorporated.

The present disclosure will now be described more fully hereinafter with reference to the accompanying drawings, in which currently preferred embodiments of the present disclosure are shown. This disclosure may, however, be embodied in many different forms and should not be construed as limited to the embodiments set forth herein; rather, these embodiments are provided for thoroughness and completeness, and fully convey the scope of the disclosure to the skilled addressee. Like reference characters refer to like elements throughout.

Figure 1B:
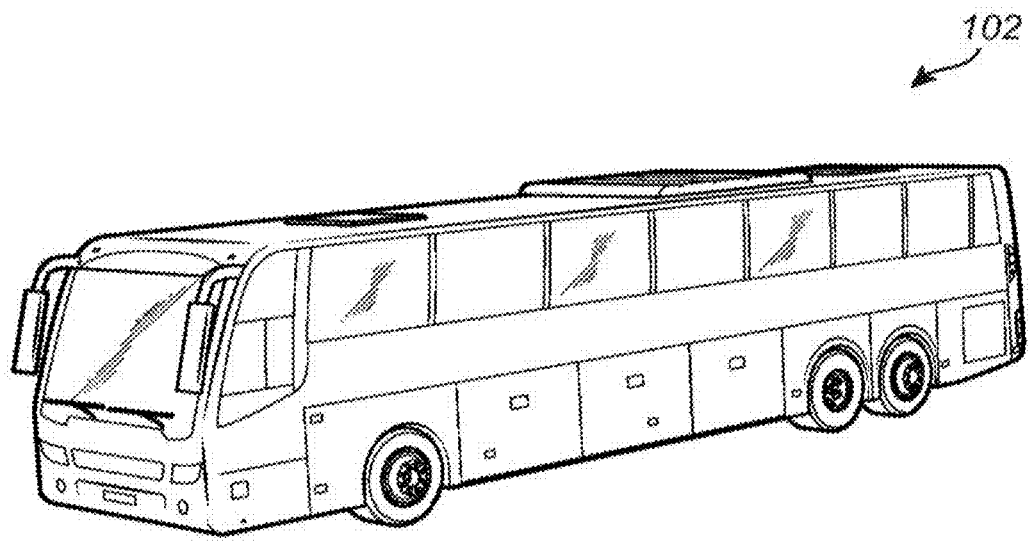
Figure 2:
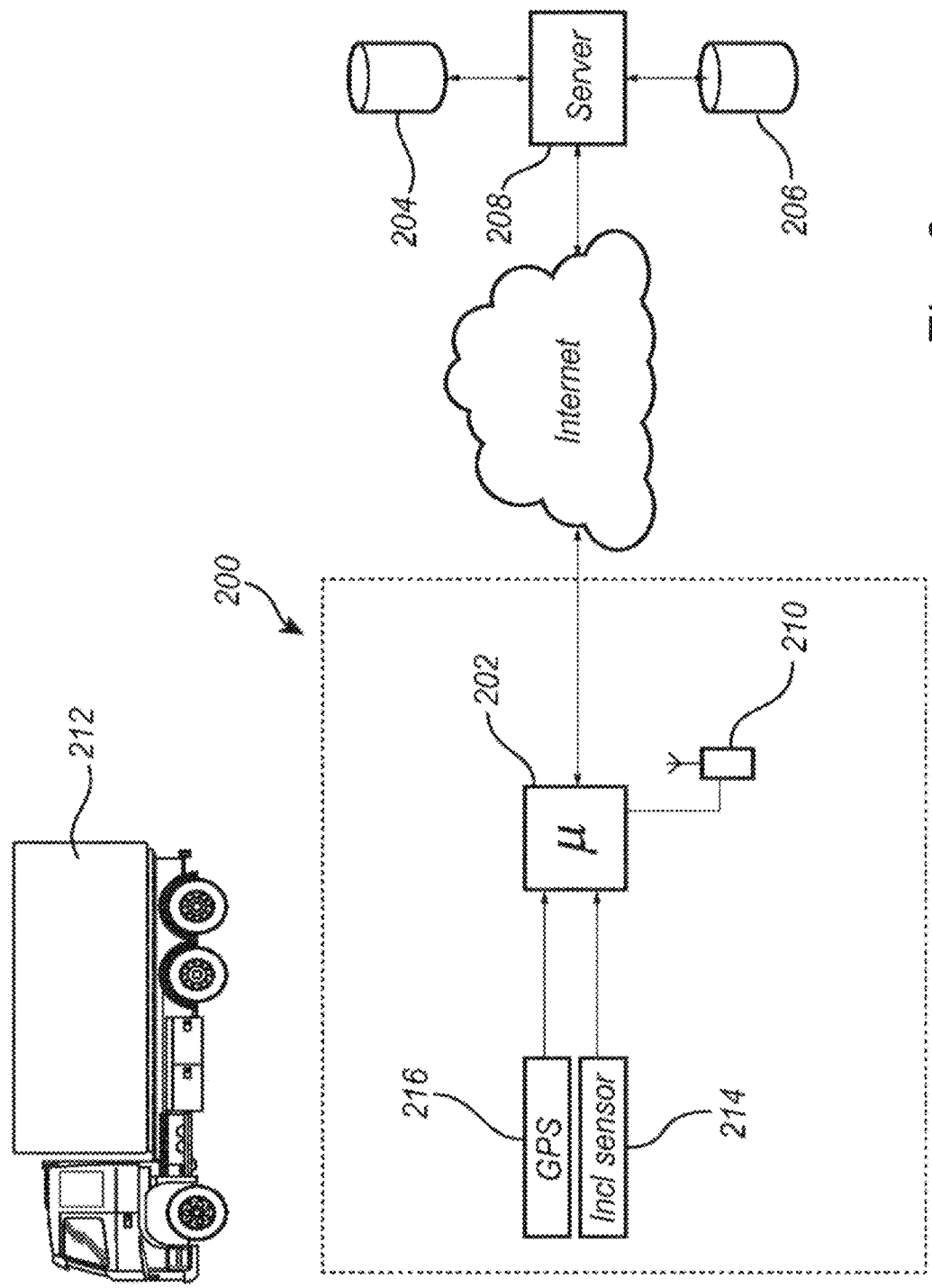
FIG. 2 conceptually illustrates the control arrangement in accordance to a currently preferred embodiment of the present disclosure.

Referring now to the drawings and to FIGS. 1A, 1B and 2 in particular, there is in FIG. 1A depicted an exemplary vehicle, here illustrated as a truck 100, in which a control arrangement 200 according to the present disclosure may be incorporated. The control arrangement 200 may of course be implemented, possibly in a slightly different way, in a bus 102 as shown in FIG. 1b, a car, etc. The vehicle is preferably an electric or a hybrid vehicle, or possibly a gas/gasoline/diesel vehicle. The vehicle comprises an electric machine (in case of being an electric or hybrid vehicle) or an engine (such as an internal combustion engine).

FIG. 2 shows a conceptual and exemplary implementation of the control arrangement 200, comprising a control unit, such as an electronic control unit (ECU) 202, for performing the operations in accordance to the present disclosure for using map data in vehicle operation and for collecting environmental data. For reference, the ECU 202 may for example be manifested as a general-purpose processor, an application specific processor, a circuit containing processing components, a group of distributed processing components, a group of distributed computers configured for processing, a field programmable gate array (FPGA), etc. The processor may be or include any number of hardware components for conducting data or signal processing or for executing computer code stored in memory. The memory may be one or more devices for storing data and/or computer code for completing or facilitating the various methods described in the present description.

The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

As discussed above, the control arrangement 200 is typically arranged in network communication, such as using the Internet, with a first 204 and a second 206 data source. The communication may in some embodiments of the present disclosure pass by e.g. a cloud server 208 allowing generalized access to the data stored at the first data source 204 and for allowing storage of data at the second data source 206. The cloud server 208 may further allow data to be transferred from the second 206 to the first 204 data source if a determination process at the cloud server 208 provides an indication that a specific part of the data stored at the second data source 206 is having a quality level above a predefined threshold, thus making it fit for use in vehicle operation.

The communication between the control arrangement 202 and e.g. the cloud server 208 is performed using a transceiver 210 comprised with the control arrangement 202. The control arrangement 200 further comprises sensor means arranged internally and externally of the first vehicle 100, 102 for determining environmental data relating to the operation of the first vehicle 100, 102. Such sensor means may for example comprise an inclination sensor 214 adapted to determine a current inclination of for a current part of a road segment currently travelled by the first vehicle 100, 102.

The control arrangement 200 may further comprise a geolocation arrangement, such as a GPS receiver 216 providing information relating to a current location of the first vehicle 100, 102, including providing information relating to a relative orientation of the first vehicle 100, 102, for determining a direction of travel at the road segment.

It should be understood that more than a single vehicle may be provided with the control arrangement 200, such as a second vehicle 212. The second vehicle 212 may similarly be adapted to communicate with the server 208 using a network connection. It should however be understood that e.g. the first vehicle 100, 102 and the second vehicle 212 may be adapted to communicate "directly" between each other, using so called vehicle-to-vehicle communication (V2V), possibly for exchanging information relating to environmental conditions, or for otherwise assisting each other in vehicle operation.

Figure 3:
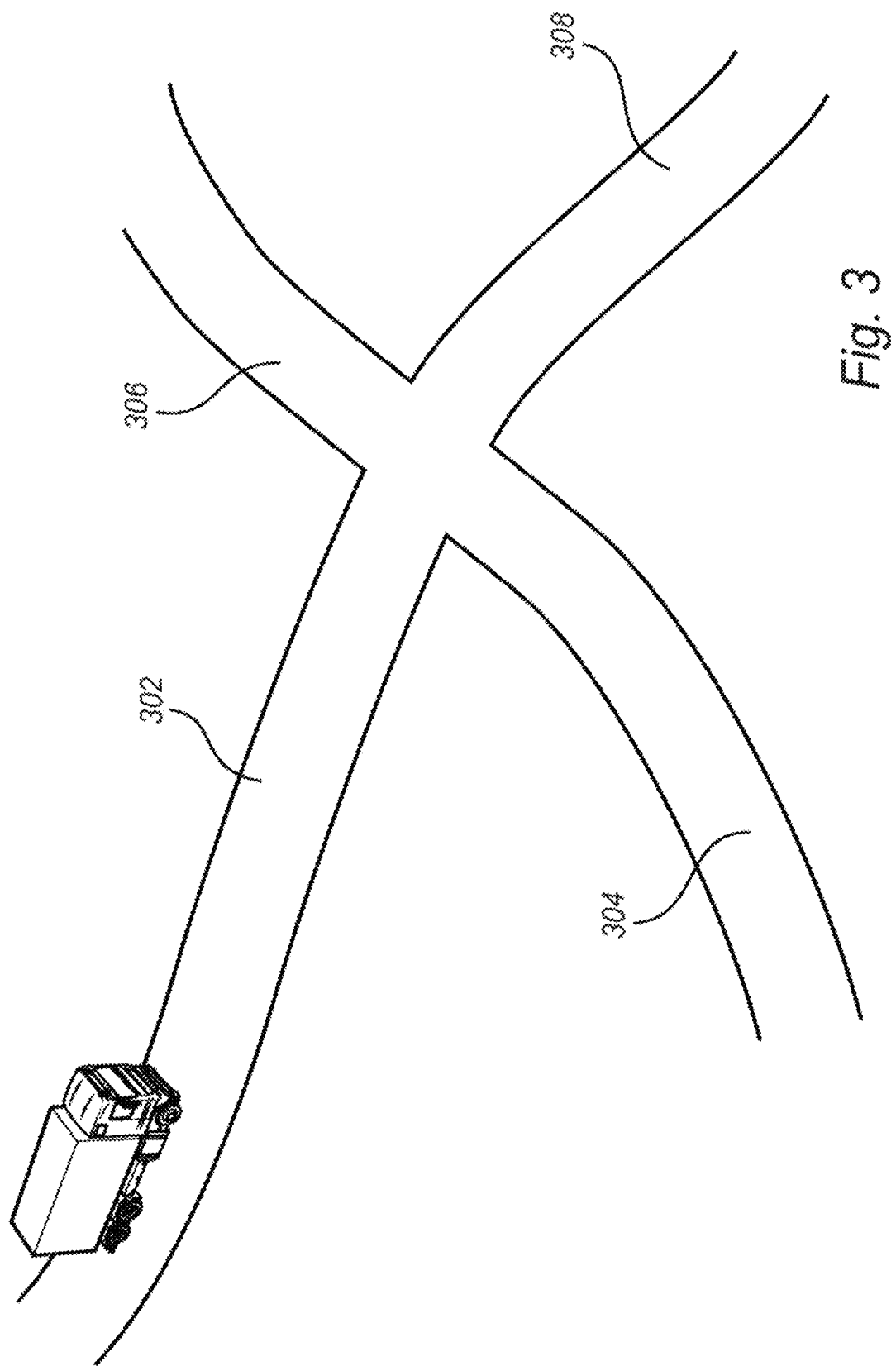
FIG. 3 exemplifies a plurality of road segments where a vehicle comprising the control arrangement may be operated.

During operation of the control arrangement 200, with further reference to FIG. 3, the first vehicle 100, 102, is travelling along a road segment 302. When travelling along the road segment 302, the control arrangement 302 receives a current geographical location for the first vehicle 100, 102 and receives map data from the first data source 204. The control arrangement 202 is now in a "use mode". The ECU 202 in turn operates the first vehicle 100, 102 taking into account the received map data. For example, the map data received from the first data source 204 may comprise information relating to an expected inclination or curvature of a portion of the road segment 302 where the first vehicle 100, 102 at present is located. The expected inclination/curvature may be used for e.g. planning operation of a transmission comprised with the first vehicle 100, 102, such as planning when and where to shift between different gears of the transmission for minimizing power/fuel consumption of the first vehicle 100, 102. Alternatively, or also, the map data received from the first data source 204 may comprise information relating to a legal speed limit at the road segment 302, whereby the ECU 202 may control the first vehicle 100, 102 such that the speed limit is not exceeded.

However, in the present embodiment as shown in FIG. 3, the first vehicle 100, 102, receives an indication from e.g. the first data source 204 that no map data is available for a next road segment to be travelled by the first vehicle 100, 102. In the example, the next road segment to be travelled is a road segment 304, connected to the road segment 302 at an intersection where two further road segments 306, 308 also are connected.

In accordance to the present disclosure, the control arrangement 200 transitions to a "collection mode", where the ECU 202 starts to receive environmental data relating to the operation of the first vehicle 100, 102 from e.g. the inclination sensor 214. The sensor data is in turn processed by the ECU 202 and information relating to a geographical location of the vehicle 100, 102 is attached/tagged/appended to the inclination data. The control arrangement 200 will then, using the transceiver 210, establish a connection with the second data source 206 through the cloud server 208. The geographically tagged inclination data is then stored at the second data source 206.

As discussed above, the cloud server 208 may subsequently apply an automated analysis process for reviewing the environmental data uploaded by the first vehicle 100, 102, for validating and quality control of the data. In case the analysis process indicates that the uploaded data is valid and has an in comparison high quality level, then the cloud server 208 may allow at least some parts of data to be used for populating the first data source 204.

Figure 4:
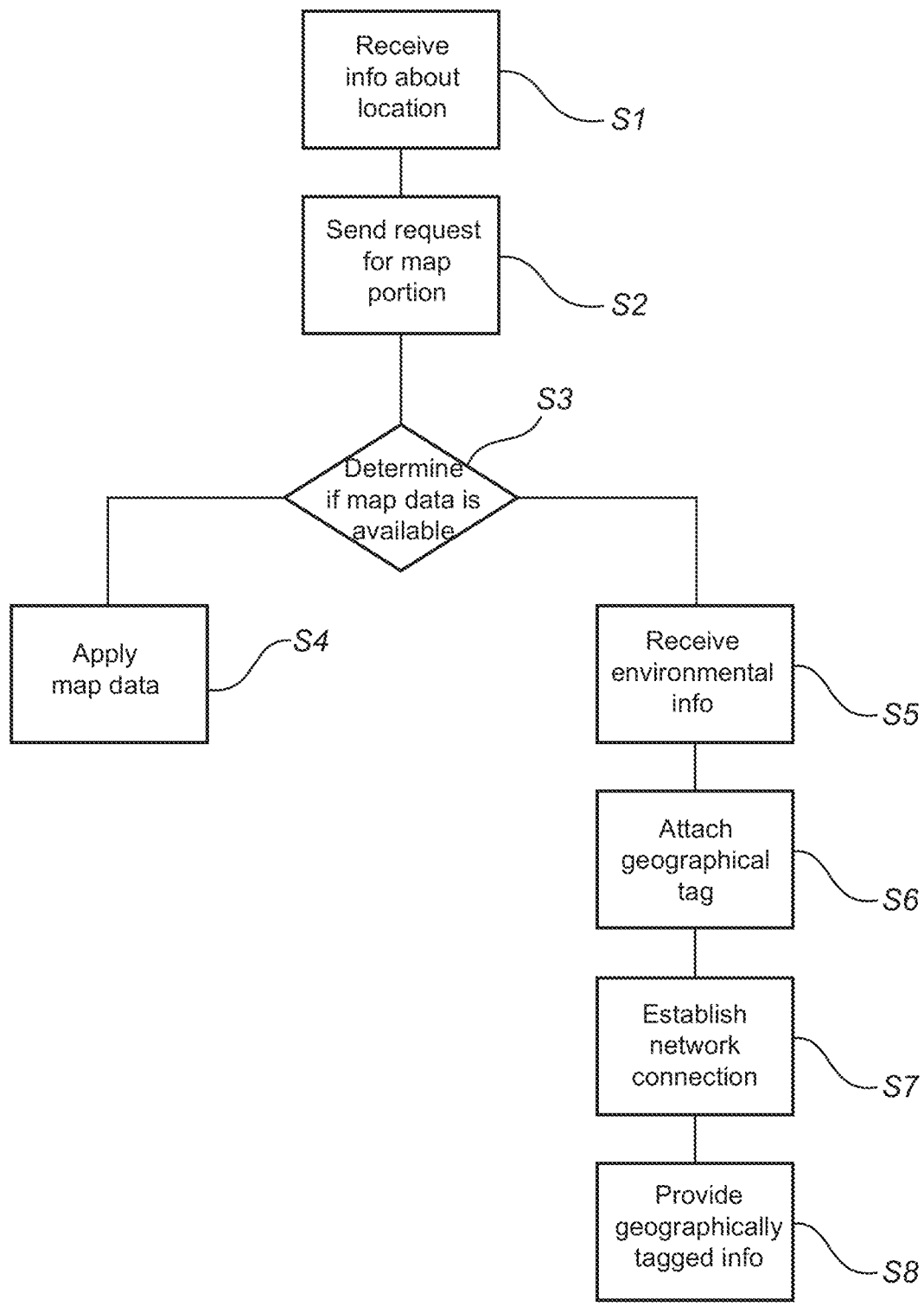
FIG. 4 illustrates the processing steps for performing the method according to the present disclosure.

Turning finally to FIG. 4, which illustrates the processing steps for performing the method according to the present disclosure. Specifically, the method according to the present disclosure comprising the steps of receiving, S1, information relating to a current geographical location of the first vehicle, 100, 102, and sending, S2 a request for a portion of map data from a first data source, 204 relating to the current location of the first vehicle, 100, 102, wherein the first data source is arranged remote from the first vehicle, 100, 102 and comprises map data for a plurality of geographical locations and each portion of the map data relates to environmental information for the related geographical location, and determining, S3 if map data is indicated as available from the first data source, 204 for the current geographical location. If map data is indicated as available then the method is continued by applying, S4 the map data for controlling at least one parameter for operating the first vehicle, 100, 102.

However, if map data is indicated as unavailable, then the method is continued by receiving, S5 environmental information relating to the operation of the first vehicle, 100, 102, attaching, S6 a geographical tag relating to the current geographical location to the environmental information for the current location, establishing, S7 a network connection with a second data source, 206, wherein the second data source, 206 is arranged remote from the first vehicle, 100, 102, adapted for storage of environmental information, and different from the first data source, 204, and providing, S8 the geographically tagged environmental information for storage at the second data source, 206.

The present disclosure contemplates methods, devices and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art.

Variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for controlling an operational parameter for a vehicle, comprising:
    receiving, at an electronic control unit of the vehicle from a global positioning system (GPS) of the vehicle, a current geographical location of the vehicle;
    determining, by the electronic control unit, requested inclination information based on the current geographical location being unavailable at a first remote server;
    receiving, by the electronic control unit, collected inclination data of the current geographical location from an inclination sensor of the vehicle;
    sending, by the electronic control unit, the collected inclination data and the current geographical location to a second remote server different from the first remote server; and
    using, by the electronic control unit, the collected inclination data to control a transmission of the vehicle.

2. The method of claim 1, further comprising sending a request for inclination information data from the first remote server relating to the current geographic location of the vehicle, wherein the first remote server comprises map data for a plurality of geographical locations including the current geographic location.

3. The method of claim 2, further comprising attaching a geographical tag relating to the current geographical location to the collected inclination data.

4. The method of claim 3, further comprising:
    establishing a network connection with the second remote server, wherein the second remote server is adapted for storage of inclination data; and
    providing the geographically tagged inclination data for storage at the second remote server.

5. The method of claim 3, further comprising:
    including a road identity (ID) for the current geographical location with the geographical tag.

6. The method of claim 1, wherein the requested inclination information is indicated as unavailable from the first remote server when a first network connection for accessing the first remote server is missing.

7. The method of claim 1, wherein the requested inclination information is indicated as unavailable from the first remote server when requested inclination information for the current geographical location is missing within the first remote server.

8. The method of claim 1, wherein at least one of the first and second remote server is a cloud server.

9. A computer program product comprising a non-transitory computer readable medium having stored thereon instructions for controlling an operational parameter for a vehicle, the vehicle provided with an on-board control arrangement comprising an electronic control unit, and a sensor arrangement, for determining a current geographical location of the first vehicle, wherein the instructions when executed to carry a method comprising:
    receiving, at the electronic control unit of a vehicle from a global positioning system (GPS) of the vehicle, a current geographical location of the vehicle;
    determining, by the electronic control unit, requested inclination information based on the current geographical location being unavailable at a first remote server;
    receiving, by the electronic control unit, collected inclination data of the current geographical location from an inclination sensor of the vehicle;
    sending, by the electronic control unit, the collected inclination data and the current geographical location to a second remote server different from the first remote server;
    and using, by the electronic control unit, the collected inclination data to control a transmission of the vehicle.

10. The computer program product of claim 9, wherein the method further comprises attaching a geographical tag relating to the current geographical location to the collected inclination data.

11. The computer program product of claim 10, wherein the method further comprises
    establishing a network connection with the second remote server, wherein the second remote server is adapted for storage of inclination data; and
    providing the geographically tagged inclination data for storage at the second remote server.

12. The computer program product of claim 11, further comprising code for including a road identity (ID) for the current geographical location with the geographical tag.

13. The computer program product of claim 9, wherein the requested inclination information is indicated as unavailable from the first remote server when a first network connection for accessing the first remote server is missing.

14. The computer program product of claim 9, wherein the requested inclination information is indicated as unavailable from the first remote server when requested inclination information for the current geographical location is missing within the first remote server.

15. A control arrangement for a vehicle, the control arrangement being provided on-board the vehicle and comprising an electronic control unit, an inclination sensor and a global positioning system (GPS) for determining a current geographical location of the vehicle, wherein the electronic control unit is adapted to:
- receive, at the electronic control unit of the vehicle from the GPS, a current geographical location of the vehicle;
- determine, by the electronic control unit, requested inclination information based on the current geographical location being unavailable at a first remote server;
- receive, by the electronic control unit, collected inclination data of the current geographical location from an inclination sensor of the vehicle;
- send, by the electronic control unit, the collected inclination data and the current geographical location to a second remote server different from the first remote server; and
- use, by the electronic control unit, the collected inclination data to control a transmission of the vehicle.

16. The control arrangement according to claim 6, further comprising a transceiver adapted to be controlled by the electronic control unit, wherein the transceiver is further adapted for establishing a network connection with at least one of the first remote server and the second remote server.

17. The control arrangement of claim 16, wherein the electronic control unit is adapted to attach a geographical tag relating to the current geographical location to the collected inclination data.

18. A vehicle comprising a control arrangement on-board the vehicle, the control arrangement comprising an electronic control unit, an inclination sensor and a global positioning system (GPS) for determining a current geographical location of the vehicle, wherein the electronic control unit is adapted to:
- receive, at the electronic control unit of the vehicle from the GPS, a current geographical location of the vehicle;
- determine, by the electronic control unit, requested inclination information based on the current geographical location being unavailable at a first remote server;
- receive, by the electronic control unit, collected inclination data of the current geographical location from an inclination sensor of the vehicle;
- send, by the electronic control unit, the collected inclination data and the current geographical location to a second remote server different from the first remote server; and
- use, by the electronic control unit, the collected inclination data to control a transmission of the vehicle.

\* \* \* \* \*